United States Patent [19]

Belanger et al.

[11] 4,369,541
[45] Jan. 25, 1983

[54] RETRACTABLE WAX, BUFF AND POLISH APPARATUS FOR CARS

[75] Inventors: James A. Belanger, Northville; Robert J. Wentworth, Ann Arbor; Douglas J. Calvin, Livonia; Graham J. Astley, Novi, all of Mich.

[73] Assignee: Belanger, Inc., Northville, Mich.

[21] Appl. No.: 251,596

[22] Filed: Apr. 6, 1981

[51] Int. Cl.³ .................................................. B60S 3/04
[52] U.S. Cl. ................................. 15/97 B; 15/DIG. 2
[58] Field of Search ............... 15/DIG. 2, 97 B, 53 R, 15/53 A, 53 AB

[56] References Cited

U.S. PATENT DOCUMENTS

| | | | |
|---|---|---|---|
| 2,610,342 | 9/1952 | Griffiths | 15/DIG. 2 |
| 3,705,435 | 12/1972 | Kulmer | 15/97 B |
| 3,859,686 | 1/1975 | Breish | 15/97 B |
| 4,057,866 | 11/1977 | Belanger | 15/97 B |

FOREIGN PATENT DOCUMENTS 1542345 10/1968 France ............................ 15/DIG. 2

Primary Examiner—Edward L. Roberts
Attorney, Agent, or Firm—Cullen, Sloman, Cantor, Grauer, Scott & Rutherford

[57] ABSTRACT

A retractable wax, buff and polish apparatus for cars includes an open framework upon a floor through which a vehicle is adapted to pass. A vertically adjustable carriage is guidably mounted upon the framework and suspends therefrom a pair of coplanar horizontal racks, each rack having a plurality of parallel spaced fabric panels at their upper ends depending therefrom, defining a segmented friction curtain adapted on lowering of the carriage and oscillation of the racks for buffing and polishing engagement with a car. A vertically adjustable counterweight is mounted upon the framework and connected by a chain and sprockets to the carriage whereby selective raising or lowering of the counterweight respectively lowers or raises the curtain. Pressurized canisters mounted upon the framework are activated on lowering of the curtain for delivering a foam of wax or detergent and water onto the car. An opposed pair of side wheel arms each mounting a power operated buffing and polishing wheel assembly are mounted upon the framework and are biased for operative engagement with the car as it passes through the framework. Hydraulic and pneumatic circuits are employed including a plurality of valve assemblies, which when activated are adapted for controlling, raising and lowering of the curtain and activation of the canisters, and the buffing and polishing wheels. A safety circuit is interposed into the pneumatic circuit for automatically raising the curtain under conditions which would otherwise damage the curtain or vehicle.

26 Claims, 9 Drawing Figures

RETRACTABLE WAX, BUFF AND POLISH APPARATUS FOR CARS

BACKGROUND OF THE INVENTION

In connection with the washing of cars, such as in a car wash, the operation thereof is substantially continuous and automatic with water and soap or detergent applied to the car body within some form of enclosure or framework wherein the car is normally cleaned and air dried. Various types of scrubbing mechanisms have been incorporated for engagement with the car surface including top and side portions and forward and rear portions for the washing and scrubbing and drying thereof in a well known conventional manner with various types of devices automatic or semi-automatic.

Very often, these devices include means by which a vehicle can be waxed and polished in the car wash line in an automatic manner if the customer desires to have this additional service and pays the additional price therefor. Examples of apparatus for washing and drying motor vehicles is disclosed in the U.S. Pat. No. 4,057,866, dated Nov. 15, 1977 entitled Apparatus For Washing and Drying Motor Vehicles. Such disclosure also includes the use of an oscillating frictional curtain adapted for scrubbing and washing engagement with a vehicle to which a liquid detergent or soap has been applied. A further example is disclosed in the U.S. Pat. No. 4,096,600, dated June 27, 1978 entitled Friction Curtain Apparatus.

In a system within which waxing and polishing may be selectively provided at the option of the purchaser, various efforts have been made for activating the waxing and polishing and buffing normally under the manual control of the operator wherein upon payment of the additional fee involved, the operator may control the application of wax foam or other detergent to a vehicle and can provide for the lowering at a predetermined time of a curtain mechanism adapted for operative friction scrubbing and waxing and polishing and buffing of the car surface over the top thereof.

The primary problem in a device of this nature is the provision of mechanism which will normally maintain the waxing, buffing and polishing apparatus inactive, but which may be automatically activated as required and which would permit the automatic application of foam detergent, or wax to the vehicle body, the automatic lowering of the polishing and buffing curtain to the body surface, the automatic application of buffing and polishing wheels to the sides of the vehicle body and the subsequent automatic application of rinse mechanism for removing the wax or detergent residues.

SUMMARY OF THE INVENTION

A primary feature of the present invention is to provide a retractable wax, buff and polish apparatus for a car such as might be employed in a conventional car wash, though not limited thereto, wherein there is mounted upon an open framework through which a vehicle is adapted to pass, a vertically adjustable carriage which suspends therefrom a friction curtain consisting of a series of depending fabric elements which may be power oscillated so as to provide a scrubbing, a polishing and buffing action over the surfaces of the vehicle to which has been previously applied a wax foam and wherein there are provided power operated buffing and polishing wheels in opposed relation adapted to operatively engage side portions of the vehicle as it passes through the framework, and wherein the oscillation of the curtain and its lowering onto the vehicle and the activation of the buffing and polishing wheels is automatic.

It is a further feature of the present invention to provide an improved counterweight actuating power means which includes a hydraulic cylinder and piston rod assembly upon the framework with its piston adapted for effecting reciprocal vertical movements of the counterweight, all in conjunction with an adjustable first valve means connected to a source of air pressure and to a hydraulic cylinder and piston rod assembly for automatically elevating the counterweight and lowering the curtain and for automatically lowering the counterweight and raising the curtain. A further feature includes the use of a plurality of pressurized canisters mounted within the framework, each canister having a plurality of inwardly facing orifices adapted for delivering selectively a foam of detergent or wax for impingement upon the car together with pneumatic and hydraulic control means actuating the canisters for delivering such foam simultaneously with lowering of the curtain into registry with the car body.

A further feature includes as a part of the pneumatic control means a first circuit with a first conduit connected to a source of pressurized air and with a normally closed second movable valve means connected to the first conduit and with a second conduit interconnecting the second valve means and each of the foam canisters whereby energizing of the second valve means effects the delivery of pressurized air to the canisters for foaming the material delivered therefrom.

A further feature includes a hydraulic control means including a second circuit with a third conduit connected to a source of water under pressure together with a normally closed third valve means interconnecting the third conduit and the canisters, and wherein there is provided a supply reservoir holding liquid wax or detergent together with an aspirator valve means adapted for receiving pressurized water from the third valve means when energized which has an inlet connected to the reservoir and an outlet connected to the canisters for delivering a mixture of wax or detergent and water thereto.

A further feature includes a pair of opposed horizontal side wheel arms, each having one end pivotally mounted upon the framework, and upon the other end mounting a hydraulic motor operated buffing and polishing wheel assembly for rotation on a substantially vertical axis for operative buffing and polishing engagement with side portions of the vehicle as it moves through the framework.

A further feature includes a horizontal shock absorber which is parallel to each side wheel arm, at one end pivotally mounted upon the framework, which includes a spring biased retractable shaft which is connected to a side wheel arm so as to normally bias the arm into operative engagement with the car.

A further feature includes an air cylinder assembly parallel to the shock absorber, with one end pivotally mounted upon the framework having a retractable piston rod connected to the side wheel arm in such fashion that when not in use and with the curtain elevated, the buffing and polishing wheel assemblies are retracted towards the framework.

A further feature includes a pneumatic circuit incorporating such air cylinder assemblies and including a solenoid controlled valve assembly interposed within the circuit for controlling the operation of the air cylinder assemblies.

A further feature is an inverted U-shaped rinse arch forwardly of and connected to the framework having a water conduit on the interior thereof with spaced orifices for delivering pressurized water therethrough. This is in conjunction with a normally closed pressure response fifth valve assembly operating in conjunction with a normally closed solenoid operated sixth valve assembly connected to a source of pressurized water from the fifth valve assembly wherein the energizing of the sixth valve assembly releases the water pressure on the fifth valve assembly which then opens permitting the flow of pressurized water through the rinse arch onto the car body.

A further feature includes a closed hydraulic circuit incorporating a pair of hydraulic motors for the side wheel assemblies in conjunction with an oil reservoir, a pump having an intake connected into the reservoir and an outlet connected to a conduit for delivering pressurized oil to the hydraulic motors. These are connected in series together with a solenoid operated normally closed two way valve for simultaneous operation of the motors on activation of the two way valve.

Another feature includes in conjunction with the canisters for delivering pressurized foam or detergent the mechanism for raising and lowering the curtain and for the oscillation of the curtain, with the operation of the buffing and polishing wheels to the vehicle body, the rinse arch for delivering rinsing water for the removal of residue of wax or detergent from the vehicle and other mechanism therein, a plurality of valve means are incorporated and connected to a plurality of circuits pneumatic and hydraulic for effecting automatic operation of the various mechanisms which form a part of the above described retractable wax, buff and polish apparatus.

A further feature incorporates the use of a pneumatic safety circuit incorporating normally closed limit switch controlled valve mechanisms connected into the source of air pressure, which when activated under certain conditions are adapted to deliver an air signal to the valve mechanism which controls the raising and lowering of the curtain for automatically elevating the curtain to prevent damage thereto as in the case of an oversized vehicle passing through the framework.

These and other features and objects will be seen from the following specification and claims in conjunction with the appended drawings.

THE DRAWINGS

It will be understood that the above drawings illustrate merely one embodiment of the invention, for illustration, and that other embodiments are contemplated within the scope of the claims hereafter set forth.

DETAILED DESCRIPTION OF AN EMBODIMENT OF THE INVENTION

Figure 1:
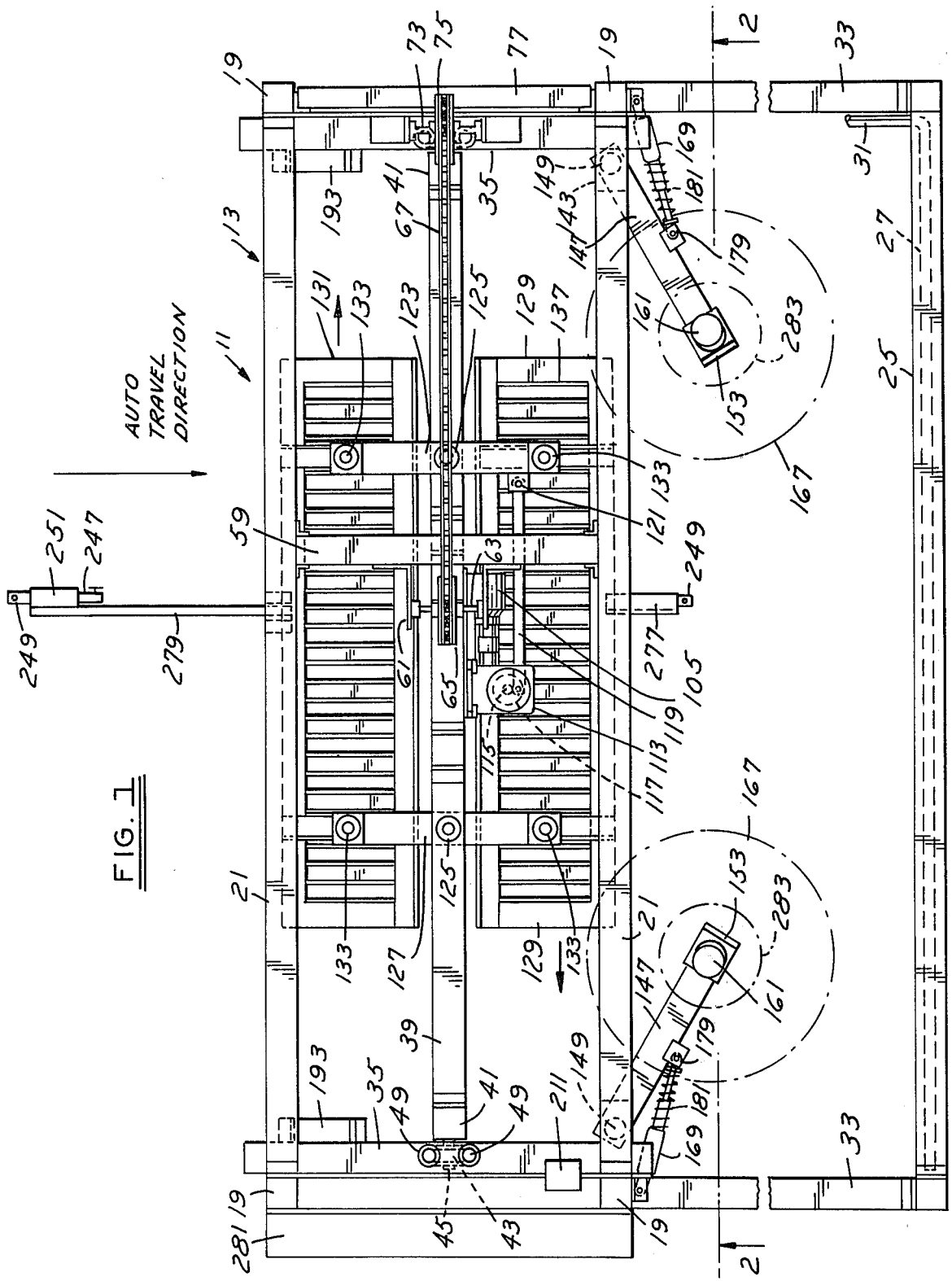
FIG. 1 is a fragmentary plan view of the present retratable wax, buff and polish apparatus for a car.
Figure 2:
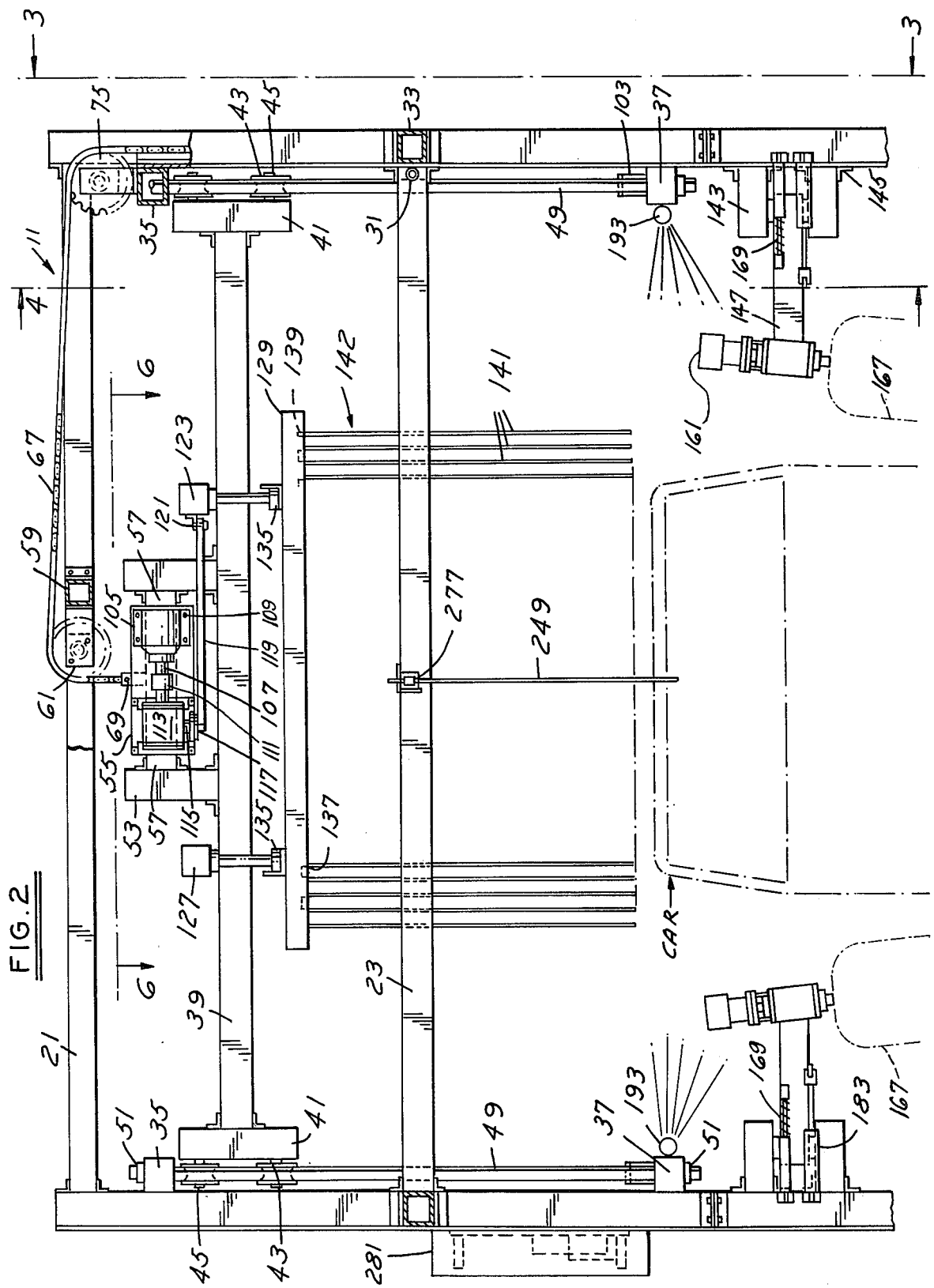
FIG. 2 is a fragmentary elevational view taken in the direction of arrows 2—2 of FIG. 1 with the car shown schematically in dash lines.
Figure 3:
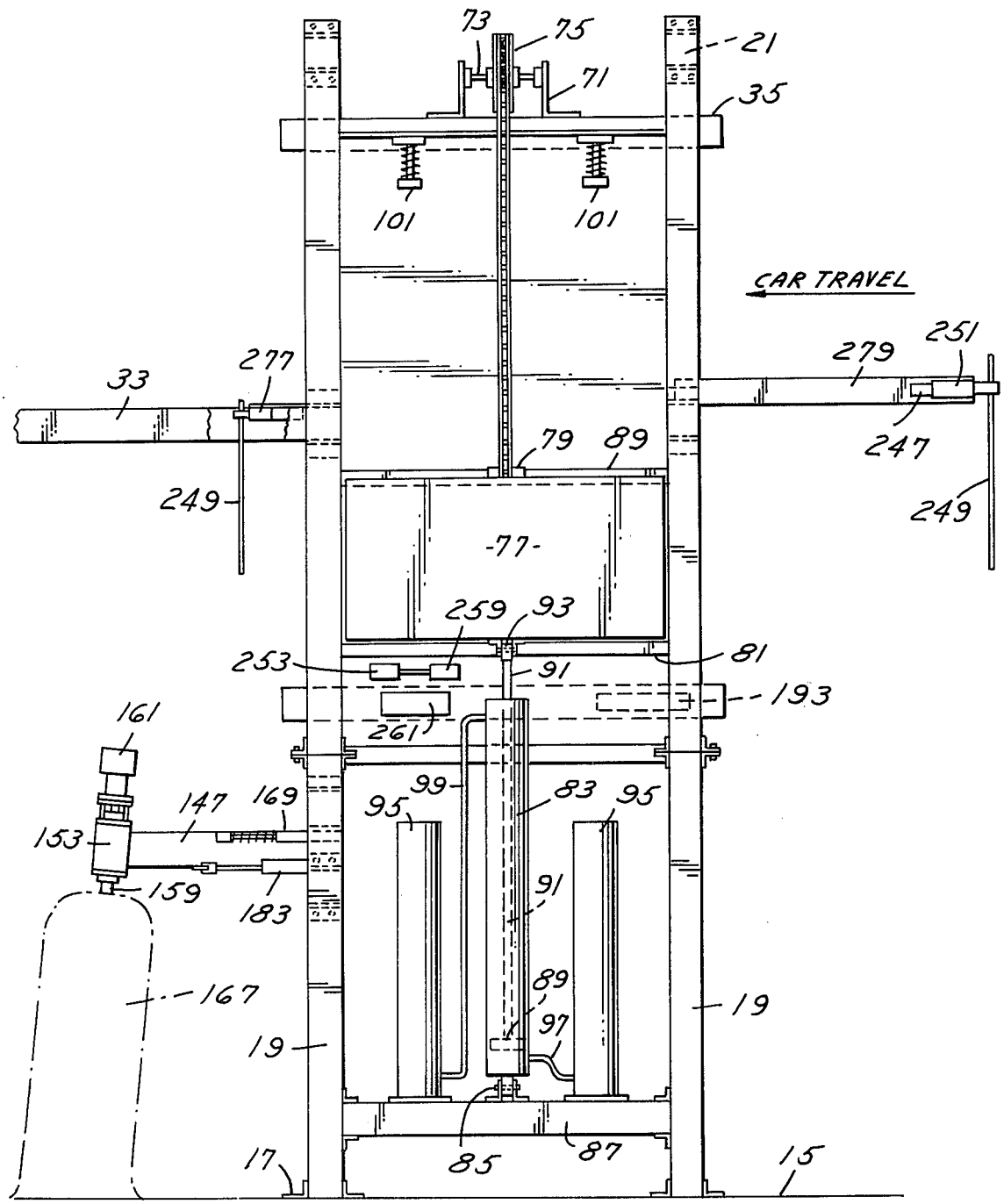
FIG. 3 is a fragmentary and partly schematic side elevational view thereof taken in the direction of arrows 3—3 of FIG. 2.
Figure 4:
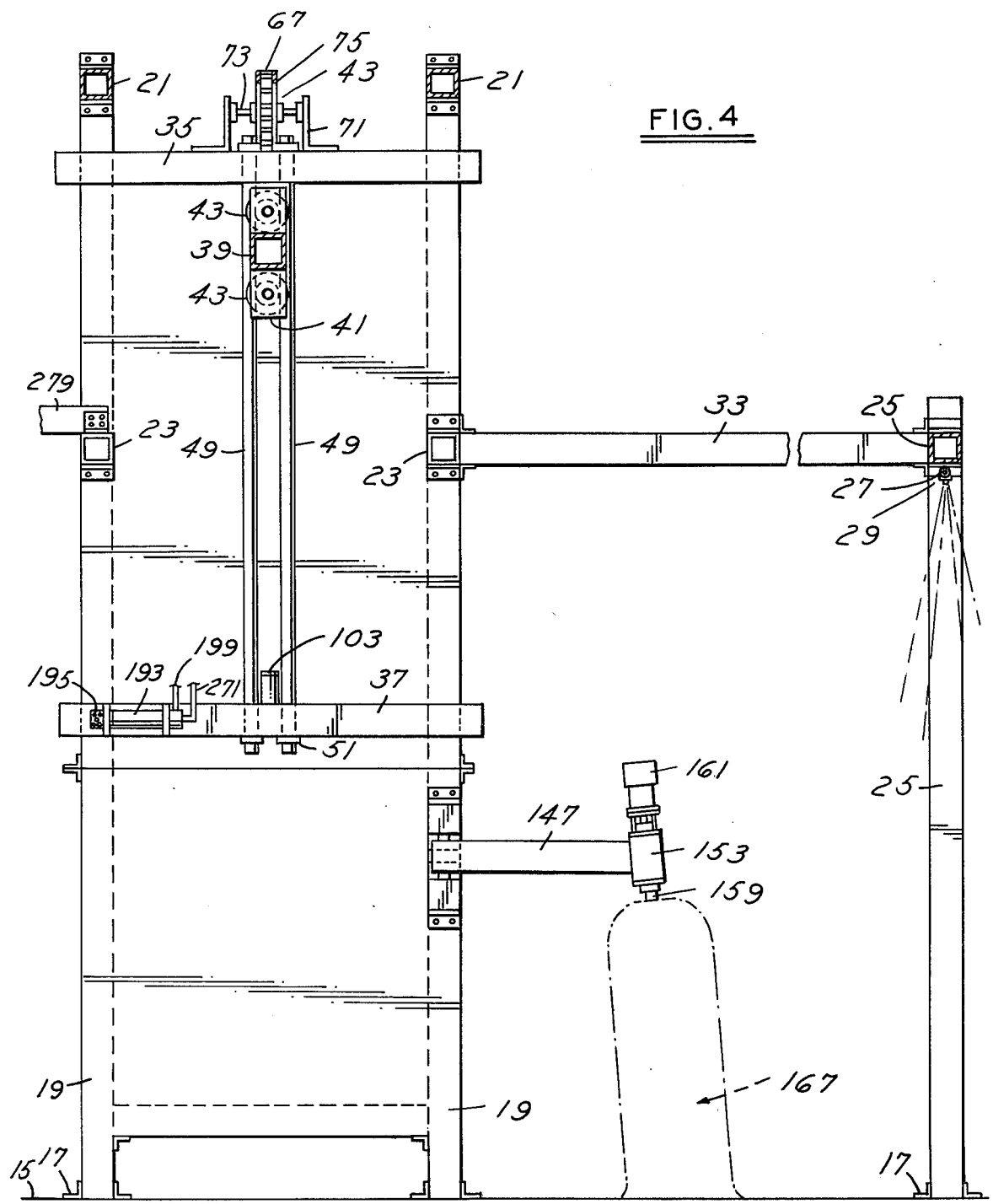
FIG. 4 is a fragmentary elevational section thereof taken in the direction of arrows 4—4 of FIG. 2.

The present automatic retractable wax, buff and polish apparatus for a car is generally indicated at 11 in FIGS. 1 and 2 and includes an open framework 13 mounted upon a floor 15, FIGS. 3 and 4, suitably anchored thereto at 17. The framework 13 includes a pair of longitudinally spaced upright side supports 19 at its opposite ends with a pair of parallel spaced top cross beams 21 spanning the supports 19.

There are a pair of horizontally disposed intermediate cross beams 23 interposed between the respective supports 19 and suitably secured thereto providing a rigid structure. A rinse arch 25 of inverted U-shape is shown in FIGS. 1 and 4 and is arranged on one side of the framework 13 mounted upon the floor 15 and anchored thereto at 17, and secured to the framework 13 by a pair of parallel laterally spaced anchor beams 33, FIGS. 2 and 4.

A continuous rinse conduit 27 of similar inverted U-shape is positioned and secured along the interior of the rinse arch 25 and suitably secured thereto, and along its length has a series of inwardly directed nozzles or apertures 29 to provide a rinsing spray upon a car or other vehicle as it moves longitudinally through the framework 13 in the direction of the arrows shown in FIG. 1.

Figure 8:
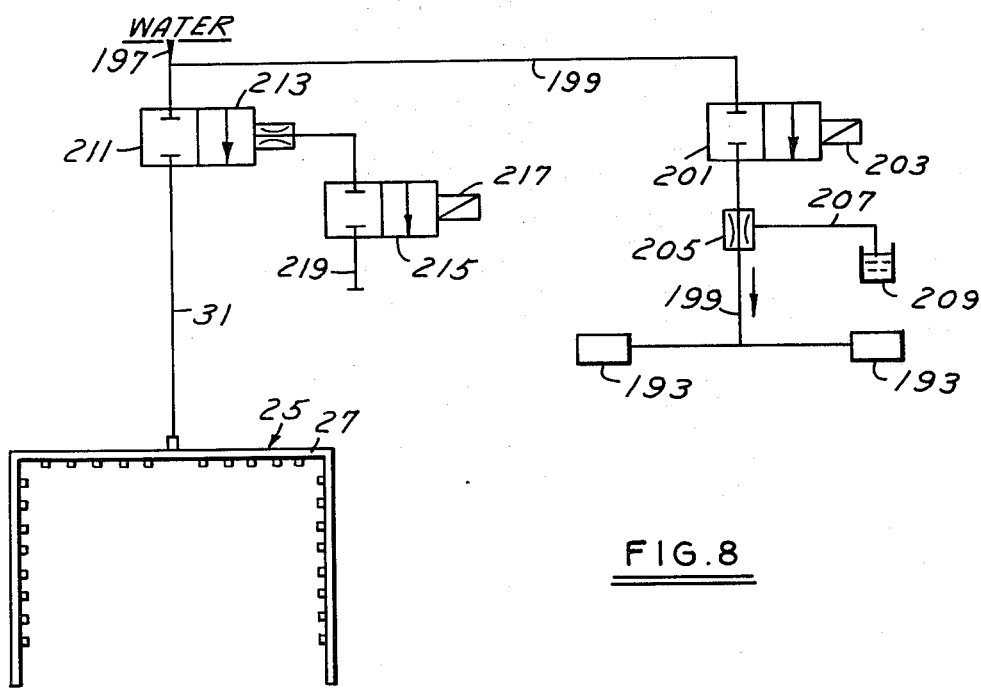
FIG. 8 is a schematic view of the water system involved in connection with the operation of the canisters and the rinse arch.

A water hose 31, FIGS. 1, 2 and 8 is mounted upon framework 13 and is connected to a suitable source of water under pressure such as shown at 197, FIG. 8, and at one end is connected to the rinse conduit 27.

Spanning the upright supports 19 at opposite ends of the framework 13, are the pair of top support beams 35 and the pair of intermediate support beams 37, suitably secured thereto as by welding or by bolts. The elongated and transverse vertically adjustable carriage 39 has secured thereto at its opposite ends the upright roller supports 41 each mounting a pair of vertically spaced rollers 43 on shafts 45.

Arranged upon opposite ends of the framework 13 and adjacent the respective supports 19 are a pair of parallel spaced upright guide rails 49 interposed between beams 35 and 37 secured or anchored thereto as at 51. Mounted upon the carriage 39 centrally thereof are a pair of longitudinally spaced carriage supports 53. Upright mount plate 55 overlies the carriage 39, is spaced between the carriage supports 53 and is suitably secured thereto as by the end anchors 57, which interconnects the carriage supports 53 and the mount plate 55.

Transverse support beam 59 spans top cross beams 21 intermediate their ends and is suitably secured thereto. A pair of opposed right angular mount brackets 61, FIG. 1 are secured to support beam 59 and support the transverse shaft 63 upon which is journalled the idle sprocket 65. An elongated sprocket chain 67 extends over idle sprocket or gear 65 and is secured by clevis anchor 69 to the mount plate 55.

A corresponding pair of opposed L-shaped mount brackets 71 are suitably secured upon beam 35, FIGS. 3 and 4, and support therebetween the transverse shaft 73 upon which is supported and journalled the idle sprocket 75 over which the sprocket chain 67 extends.

An elongated upright rectangular counterweight 77 weighing 450 pounds, approximately for example, includes a surrounding frame 81, which is guidably disposed between one of the pair of end supports 19, FIG. 3 and is secured to a free end of the chain 67 as by the anchor 79. An upright hydraulic cylinder 83 at its lower end is anchored at 85 to the bottom cross beam 87 which is interposed between supports 19 and suitably secured thereto. The cylinder 83 includes the reciprocal piston 89, has connected thereto the piston rod 91 which projects from the cylinder 83 and is flexibly secured to the lower end portion of the counterweight 77, centrally thereof as at 93.

A pair of upright spaced oil reservoirs 95 are arranged upon opposite sides of the cylinder 83 and at their lower ends are mounted upon and secured to cross beam 87. A pair of conduits 97 and 99 at their one ends are connected to the lower ends of the oil containing reservoirs 95 and at their opposite ends are respectively connected to opposite end portions of the hydraulic cylinder 83 as in FIG. 3.

Figure 7:
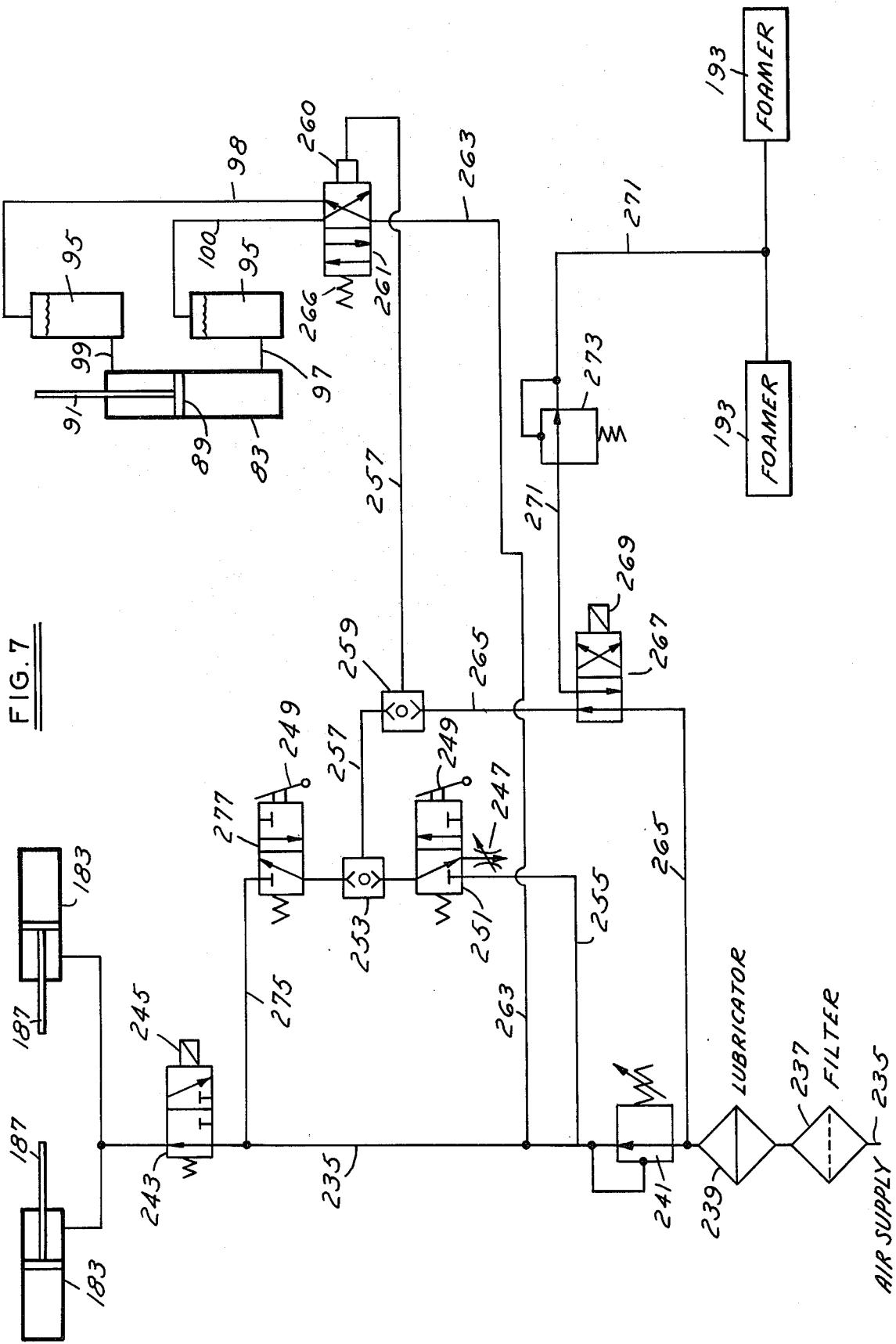
FIG. 7 is a schematic diagram the pneumatic circuit.

Air pressure applied as in FIG. 7 to the end of the upper reservoir 95 pressurizes the oil therein and through conduit 99 causes, the piston rod 91 to be retracted or lowered to the position shown in FIG. 3, with the counterweight 77 in its lowermost position. Application of pressurized air to the other fluid reservoir 95 causes hydraulic fluid therein to be delivered by conduit 97 to the lower end of the hydraulic cylinder 83 for elevating the piston 89 and connected piston rod 91, for raising the counterweight 77.

A pair of laterally spaced counterweight yieldable spring shock absorber stops 101, FIG. 3, secured to the undersurface of cross beam 35 are normally spaced from, but in the path of movement of the counterweight 77 to limit upward movements thereof. Corresponding upright carriage stops 103 are mounted centrally of the beams 37, FIG. 4 and between the guide rails 49, are normally spaced below the counterweight 77 when elevated for limiting downward movement of the counterweight 77.

Motor 105 with drive shaft 107 is suitably secured as at 109 to the mount plate 55 and is coupled as at 111 to the input shaft of the gear box 113, also secured upon mount plate 55. Output shaft 115 from the gear box 113 is eccentrically connected to one end of the pitman arm 117, whose other end is pivotally connected to one end of the drive arm 119.

The arm 119 at its opposite end is pivotally connected as at 121, FIG. 1 to the transverse driven or mount arm 123. Forming a part of the polishing and buffing curtain hereafter described, there are mounted upon the carriage 39 centrally thereof, a pair of mounting arms 123 and 127 pivoted centrally thereof at 125 upon carriage 39 and extending transversely thereof. A pair of horizontal parallel spaced coplanar curtain racks 129 and 131 are spaced below the carriage 39 centrally thereof. Support rods 133 are mounted on and depend from end portions of the respective mount arms 123 and 127 and are pivotally connected at their lower ends as at 135 to the respective end portions of the racks 129,131 centrally thereof.

A plurality of elongated and undercut transverse or angular retainer slots 137 are formed within the undersurface of each of the respective racks 129,131 and can extend transversely thereof or at any other suitable acute angle to their longitudinal axes and are adapted to receive the beads 139 at the upper ends of a series of parallel spaced rectangular fabric strips 141. Accordingly the respective strips 141 are anchored flexibly at their upper ends to the corresponding racks 129 and 131 and depend therefrom and together define a flexible friction wax and polish curtain 142.

Upon energization of the motor 105 and the connected gear box 113, there is effected continuous reciprocal movements of the drive arm 119 which is pivotally connected to one of the mount arm or driving arm 123 to provide for a reciprocal oscillation of the respective interconnected racks 129 and 131. The flexible curtain 142 including the plurality of rectangular fabric strips 141 is adapted to frictionally and operatively engage top surface portions of the car as it moves therebelow for a buff and polishing function.

Figure 5:
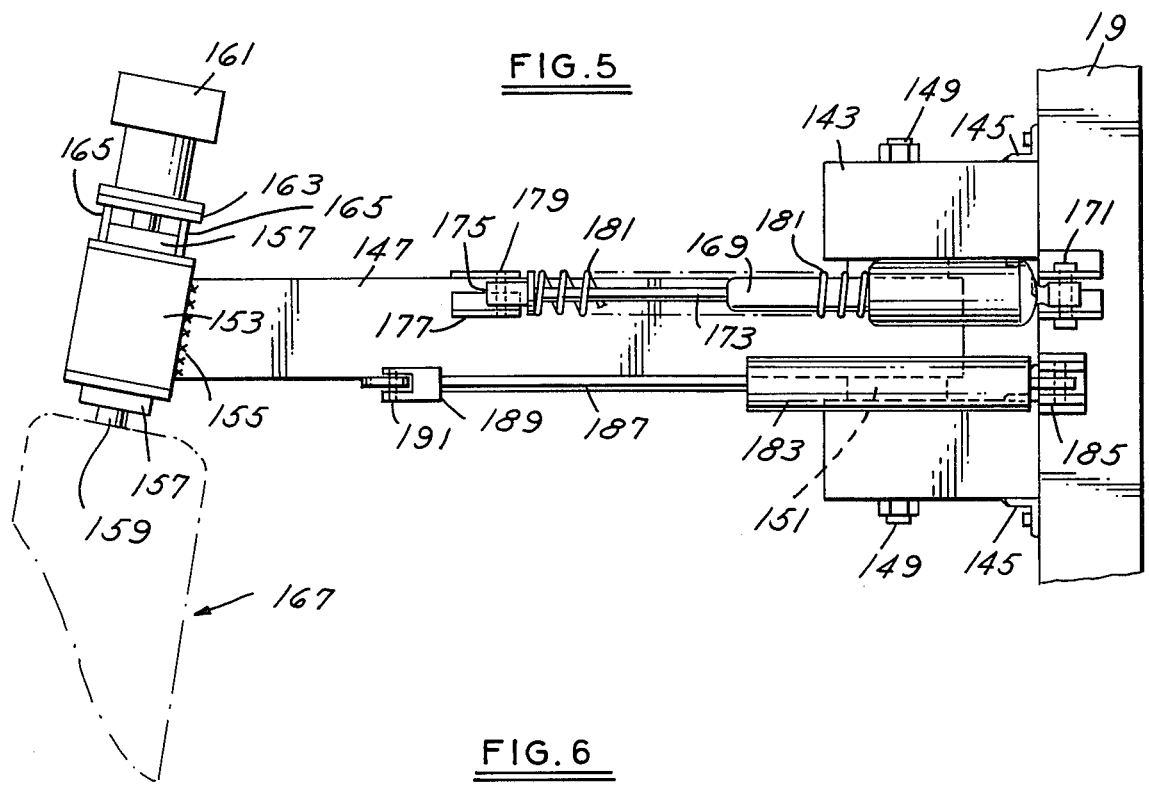
FIG. 5 is a fragmentary partly broken away front elevational view of one of the buff and polish wheel assemblies as pivotally mounted upon the framework.
Figure 6:
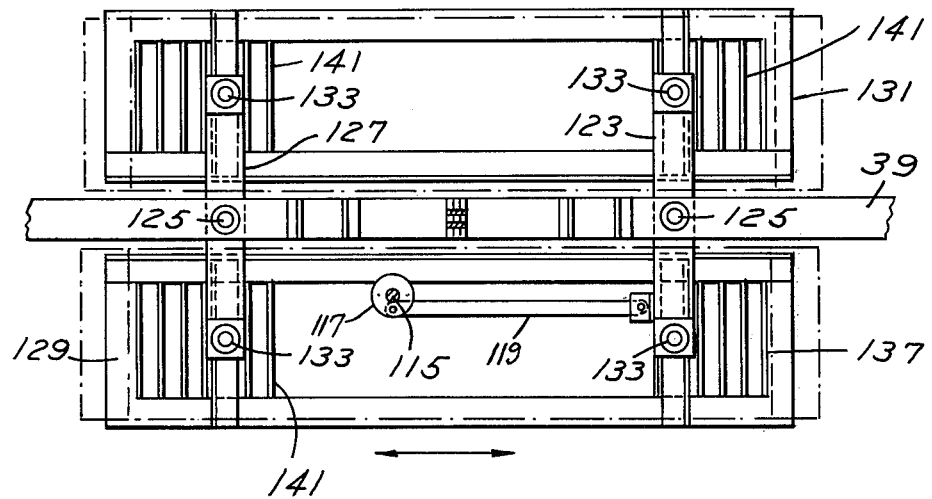
FIG. 6 is a fragmentary plan view of the carriage and depending curtain assembly shown in FIG. 1, with parts removed for clarity.

A pair of vertically spaced trunnion mount plates 143, FIGS. 1, 2 and 5 are mounted upon opposite sides of the framework 13 upon the forward side of the opposed pair of supports 19 and suitably secured thereto as at 145. Side wheel arm 147 is horizontally disposed and at one end is interposed between the corresponding trunnion mount plates 143 and pivotally mounted thereon by the upright bearing shaft 149 which extends between the mount plates 143 and is suitably secured thereto. The bearing shaft 149 extends through the upright bearing 151 which is mounted upon and extends between the trunnion mount plates 143 to complete the pivotal mounting for each of the horizontal side wheel arms 147.

The bearing housing 153, inclined at an angle of approximately 5 degrees to the vertical, is mounted upon the inner or one end of the side wheel arm 147 and suitably secured thereto as by welds 155. A cylindrical bearing 157 is mounted upon and extends through the bearing housing 153 and is adapted to journal the drive shaft 159 of the hydraulic motor 161 which overlies the bearing housing 153. For this purpose, the motor 161 is mounted and secured upon torque plate 163 which is retained by a series of torque bars 165 to the bearing housing 153.

The drive shaft 159 extends below bearing housing 153 and has secured to an end portion thereof, buffing a wheel and polish assembly 167.

The wheel assembly 167 includes a cylindrical body or hub 283, FIG. 1 which is centrally secured to the drive shaft 159 for rotation therewith. A plurality of cloth flaps at their inner ends are removably secured to slotted portions of the cylindrical wheel body or hub 283 to define a buffing wheel such as shown in FIG. 5 of the shape shown. On rotation the buffing wheel assembly 167 will be of a circular form as shown in FIG. 1.

In operation, the buffing wheel assembly 167, when in the position shown with respect to the car in FIG. 1 and upon rotation thereof will operatively engage lower portions of the car at the side portions thereof as it moves transversely through the framework 13, as shown by the arrow in FIG. 1, for the purpose of buffing and polishing corresponding side portions of the car body.

As shown in detail in FIG. 5, each horizontal shock absorber 169 is parallel and spaced from the side wheel arm 147 and is pivotally mounted to the corresponding support 19 as at 171. The shock absorber 169 includes the axially projecting shock arm 173 having a connector 175 at its outer end which is pivotally connected to the bracket 177 upon side wheel arm 147 as by pivot pin 179.

Elongated compression spring 181 is mounted upon the shock arm 173 and is interposed between the body of the shock absorber 169 and the connector 175 so as to normally bias shock arm 173 outwardly of the shock absorber 169. This is for the purpose of moving the side wheel arm 147 and the connected buff and polish wheel assembly 167 into operative engagement with a side portion of the vehicle which is moving longitudinally through the framework 13.

As further shown in FIG. 5, spaced below and parallel to the shock absorber 169 is an air cylinder assembly 183 at one end pivotally mounted as at 185 upon the adjacent frame support 19 and which includes the reciprocal piston rod 187 connected by the clevis 189 and the pivot connection 191 to a portion of the side wheel arm 147. In the operation of the present retractable wax, buff and polish apparatus 11, when the corresponding friction curtain 142 is elevated and inoperative, the corresponding air cylinder 183 is effective to retain the buffing wheel assemblies 167 in a retracted position as shown in FIG. 2.

A plurality of foamer canisters 193 are secured upon the interior of the framework 13 such as upon the respective support beams 37 and as shown in FIGS. 2 and 4. Each canister 193 at one end thereof has a series of jet outlets 195 adapted for delivering a foam consisting of wax and water, water and a detergent or a soap onto portions of the car within the framework 13 such as shown in FIG. 2.

The respective canisters 193 require a supply of water under pressure as well as air under pressure for the purpose of delivering a foam of wax, soap or detergent and water from a reservoir onto the vehicle.

For this purpose and as shown in FIG. 8, there is provided a water circuit which includes the water supply pipe 197 connected to a suitable source of water under pressure which through the conduit 199 provides water under pressure to the normally closed solenoid operated two way water control valve 201. On energization of its corresponding solenoid 203 water is delivered under pressure through the aspirator valve 205 and continues through the conduit 199 to end portions of the respective canisters 193.

Valve 205 is a suction type of valve or a siphon valve which includes a suction line 207 which extends into the reservoir 209 normally storing a liquid wax, or a liquid soap or detergent. Passage of water through the valve 205 creates a suction or low pressure condition so that either wax or soap or detergent is withdrawn from storage 209 and is mixed with the water flowing through the conduit 199 for supplying a mixture of water and wax or detergent or soap into the respective canisters 193.

Each of the respective canisters 193 in order to provide the foam material delivered to the vehicle is connected with a pneumatic circuit hereafter described with respect to FIG. 7.

Further referring to FIG. 8, a portion of the water system for controlling the flow of pressurized water to the rinse arch 25 is illustrated wherein the same source of water pressure 197 is connected to the normally closed diaphragm operated water control valve 211. In the position shown in FIG. 8, the water supply to the rinse arch 25 is blocked until its pressure responsive diaphragm is moved to such position as will permit the flow of pressurized water therethrough.

The normally closed solenoid operated two way valve 215 having a solenoid 217, when opened, releases water to conduit 219 through the orifice plate or volume control 213 for operating the diaphragm within valve 211. Opening of the valve permits the flow of pressurized water through water pipe 31 to the rinse arch 27. The conduit 219 is connected to drain as shown in FIG. 7.

Figure 9:
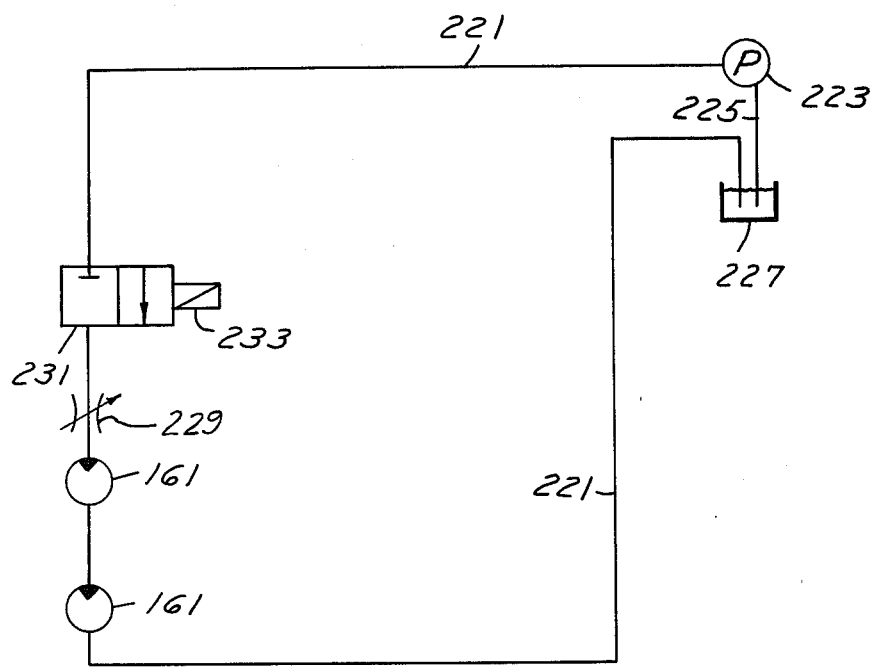
FIG. 9 is a schematic diagram of the hydraulic circuit for the buff and polish wheel assemblies.

A simplified hydraulic circuit is shown schematically in FIG. 9 for the operation of the in series mounted hydraulic motors 161 which drive the buff and polish wheel assemblies 167. For this purpose, there is employed in the circuit, the hydraulic pressure line 221 connected to the output of the pump 223 having an intake 225 which extends into the oil reservoir 227.

A solenoid operated two way normally closed hydraulic valve 231 is connected to a pressure compensated adjustable flow control valve assembly is shown at 229, both of which are connected into the hydraulic pressure line 221. On energizing solenoid 233 of valve 231 oil under pressure is delivered in a series circuit through the hydraulic motors 161 of the respective wheel assemblies 167 and the exhaust oil is returned through the pipe line 221 back to the reservoir 227.

A pneumatic circuit is schematically shown in FIG. 7 for use in conjunction with the present retractable wax, buff and polish apparatus 11 and includes pressurized air supply line 235 connected to a suitable source of compressed air. The compressed air is adapted to pass through a conventional filter 237 and separates moisture from the air, thence through the oil lubricator 239 providing lubrication for the respective valves in the present system.

Connected into the supply line 235 is self relieving adjustable pressure regulator 241 for determining the amount of air pressure to be provided into the pneumatic circuit.

A normally open solenoid controlled three way valve 243 receives pressurized air from the air line 235 which is delivered to end portions of the respective air cylinders 183 for normally maintaining the corresponding buff and polish wheel assemblies 167 retracted and in an inoperative mode. Accordingly, energizing the solenoid 245 cuts off the flow of pressurized air to the air cylinders 183 so that the corresponding spring biased shock absorber arms automatically bias the wheel assemblies, 167 outwardly into operative engagement with side portions of a car or vehicle.

There is provided an adjustable flow control 247 which is connected to the normally closed three way valve 251 operated by the limit switch 249. This adjustable flow 247 control provides for a time delay effect in connection with the corresponding overhead limit switch actuated three way valve 251. Its function is a safety device used in the pneumatic circuit to prevent damage caused by having the overhead curtain coming down and interfering with an automobile which is oversized or too great in height and which might otherwise damage the flexible friction curtain 142 of FIG. 2. The normally closed three way valve 251 forms a part of a safety circuit.

On opening of the normally closed three way valve 251, on activation of the limit switch 249, pressurized air from the conduit 255 is delivered through the three way valve 251 and into the shuttle valve 253, through conduit 257, through the shuttle valve 259 delivering pressurized air through the conduit 257, and through the air pilot end 260 of the spring biased four way valve 261.

A branch pressure air supply pipe 263 further connects the main air supply line 235 with the air pilot spring biased four way control valve 261. This pressurized air will be delivered through either of the conduits 98 or 100 depending upon the position of the movable valve element within the four way valve 261. Thus, the pressurized air delivered through either of the conduits 98 or 100 is adapted to alternately pressurize the respective reservoirs 95 and in turn controlling the positioning of the piston 89 within the hydraulic cylinder 83. This causes elevating or retracting of the counterweight 77 such as shown in FIG. 3.

An additional branch air pipe or conduit 265 extends between the main air pressure line 235 to the solenoid operative four way valve 267, one branch of which is shown normally open with respect to the air pipe 265 to the shuttle valve 259. Thus in the inoperative mode of the present circuit, pressurized air on the initial energization of the equipment, passes through the shuttle valve 259, through conduit 257 and provides a pressure signal to the air pilot control 260 such as to move the valve element in valve 261 against the action of its spring 266 to such position that air pressure from line 263 will normally be delivered through the conduit 98 and to the reservoir 95 which causes oil to flow through conduit 99. This normally maintains the piston 89 and the counterweight 77 connected thereto in its lowermost position maintaining the curtain 142 in its elevated position, FIG. 2.

The solenoid operated four way valve 267 includes the solenoid 269, which when energized, cuts off the flow of pressure air through the pipe 265 and permits the flow of pressurized air through the conduit 271, through the self relieving adjustable pressure regulator 273 for connection to the one end of the respective foam canisters 193.

Forming a part of the safety circuit is the second normally closed limit switch operated three way valve 277, wherein the normal mode, the supply of pressurized air thereto through the air conduit 275 is blocked. The valve 277 includes a limit switch 249.

As shown in FIG. 3, parallel to the direction of car travel as shown by the arrow, centrally thereof there is the rearwardly extending locator arm 279 which mounts the safety limit switch controlled three way valve 251, from which depends a limit switch including the wand as at 249. The limit switch wand 249 is adapted for engagement with a portion of the car, should it be too high for safe passage through the framework and likely to damage the friction curtain 142 if lowered. The activation manually of the limit switch and its wand 249 opens the normally closed valve 251 so that an air signal is delivered through the shuttle valves 253 and 259 and the conduit 257 to the pilot end 260 of the four way valve 261 providing an air signal for positioning the valve element therein such as would cause lowering of the piston 89 in the cylinder assembly 83 and the automatic raising of the curtain 142 to an inoperative position.

As further shown in FIG. 3, upon the downstream end of the framework 13 and projecting forwardly thereof, there is arranged the limit switch operated safety normally closed valve assembly 277 whose limit switch 249 is controlled by the depending wand forming a part thereof which is activated by engagement of a portion of the vehicle. This contact will cause further and automatic retraction of the curtain 142 to its inoperative position.

Schematically shown in FIGS. 1 and 2 is a control panel 281 mounted upon one end of the framework 13 by which the control switches for the respective circuits may be activated by push button or otherwise, including electric terminals, electrical connections, hydraulic and pneumatic connections.

OPERATION

In the normal inoperative mode, the overhead racks 129 and 131 which support the curtain 142 are in an elevated position out of contact with an automobile or car adapted to move through the open framework 13 such as shown in FIG. 2 and in direction of car travel shown by the arrows in FIGS. 1 and 3. If a person pays the required fee so as to require a wax job upon the vehicle as in a conventional car wash or otherwise, the sequence of operations is as follows. Application of a push button manually energizes the solenoid 245 of valve 243 so as to deactivate the air cylinders 183. The buff and polishing wheel assemblies 167 are automatically biased by the corresponding shock absorbers 169 to the operative position shown in FIG. 1.

At the same time, the normally open valve 267 is shifted by the contemporaneous activation of its solenoid 269. This cuts off the air signal through the air pipes or conduits 265 and 257 to the pilot end 260 of the four way valve 261 so that its spring 266 reverses the position of the valve element such that pressurized air is delivered through the conduit 100 to the reservoir 95 and the oil therein is directed through the conduit 97 to the lower end of the hydraulic cylinder 83. This elevates the counterweight 77 and lowers the curtain 142 connected thereto. At the same time, this reversal of the valve 267 permits the flow of pressurized air through the air conduit, 271 through the regulator 273 for delivery to the respective foam canisters 193 to initiate the foaming action of the respective canisters 193 to which a fluidized mixture of wax or polish or detergent is separately delivered through the circuit as described with respect to FIG. 8. The one push button is electrically connected so that the respective solenoids 245 and 269 are activated simultaneously.

At the same time, the hydraulic or water circuit shown in FIG. 8 is activated. The same electrical circuit energizes the solenoid 217 of the normally closed two way valve 219 thereby releasing pressurized water, thus operating the diaphragm within the normally closed water control valve 211. Pressurized water from the supply pipe 197 is delivered through water pipe 31 to the rinse arch 25. This is for rinsing off the wax or soap or detergent excess which may remain upon the car body.

The branch water pipe 199 provides pressurized water for delivery to the foam canisters 193. The same electrical signal activates the solenoid 203 of the valve 201 opening that valve so that pressurized water passes through the aspirator or suction valve 205 for drawing from the supply tank 209 liquid wax or soap or a detergent for mixing with the water delivered through conduit 199 to the respective canisters 193. This is in conjunction with the delivery of pressurized air to the canisters 193 such as above described with respect to FIG. 7.

Referring further to FIG. 7, in the normal mode of operation of the pneumatic circuit, air supply through the line 235 is through the normally open three way valve 243, to the ends of the cylinders 183 whereby the buff and polish wheel assemblies 167 are normally retracted. Passage 265 delivers pressure air through the normally open portion of valve 267, through shuttle valve 259, conduit 257 to the pilot end 260 of the four way valve 261 thereby moving the valve element therein against its spring 266. The flow of pressure fluid is through pipe 263 as shown in FIG. 7, through the conduit 98 pressurizing the liquid reservoir 95 thereby delivering hydraulic oil through the conduit 99 to the upper end of the cylinder assembly 83 which normally maintains the counterweight 77 in its lowermost position, FIG. 3 and the curtain 142 in its elevated position. Thus, the curtain 142 is out of contact with the car. In this mode, the foamer system designated at 193, FIGS. 7 and 8 is inoperative.

As shown in FIG. 7, pressurized air through the conduits 255 and 275 always act upon the normally blocked limit switch controlled safety valves 251 and 277. Nothing actually happens in that system. In the event that either of the valves 251 or 277 are changed from the position shown by manual activation of either of the limit switch members 249 and the connected wands by engagement with a car, pressurized air will pass through either of these two safety valves, through the shuttle valve 253, shuttle valve 259 and conduit 257 to provide an air signal to the pilot end 260 of the four way valve 261. This air signal is against the action of spring 266, the valve element of valve 261 is in the position shown so that pressurized air from the supply conduit 263 to the valve 261 is delivered through the conduit 98 to the upper end of the reservoir 95 so that the piston 89 within the hydraulic cylinder 83 is in its retracted position. The counterweight 77 is lowered and the curtain 141 raised.

POLISHING AND BUFFING MODE

Assuming that there has been a payment of the required fee for the extra service of waxing and polishing, such as might be employed in a car wash or elsewhere, pressing of a control button in the control panel, energizes the normally open valve 243, FIG. 7 taking all air pressure off the cylinders 183 so that the buffing wheel assemblies 167 are automatically biased by the shock absorbers 169 into operative engagement with the vehicle or car within the framework 13.

Thus, the buffing wheel assemblies 167 are adapted to buff and polish the corresponding side portions of the vehicle and its front and rear ends as the vehicle gradually moves through the framework 13. The air in the respective cylinders 183 no longer pressurized, is directed through the respective valve 243 to atmosphere. It is the function of the shock absorbers 169 and the extensive rods 173 thereof under the influence of the compression springs 181 to bias the buffing wheel assemblies 167 to the operative position shown in FIG. 1.

Simultaneously, the solenoid 269 has been energized, and the valve element within the four way valve 267 is shifted so that pressurized air from the conduit 265 is delivered by a conduit 271 through the adjustable pressure regulator 273 to the foam canisters 193.

At the same time, with the blockage of pressurized air through the conduit 265 through the now closed solenoid valve 267 spring 266 in the four way valve 261 is effective to return the valve element to an operative position reversing the flow of what is shown in FIG. 7. This means that the pressurized air in the conduit 263 is now delivered through the four way valve 261 through the conduit 100 to the reservoir 95 and thence hydraulic pressure fluid from reservoir 95 is directed through conduit 97 to the lower end of the cylinder assembly 83. This elevates the piston 89, the connected piston rod 91 and the counterweight 77 connected thereto. This causes friction curtain 141 to move to a lowermost position so that with automatic energization of the motor 105 shown in FIG. 2, there is provided a continuous oscillation of the racks 129 and 131 such that there is a continuous scrubbing and polishing action of the respective curtain 142 and the elements 141 therein against adjacent portions of the vehicle surface to which wax has been applied, or detergent, or soap by the respective above described canisters 193.

Thus, the curtain moves 142 down upon the automobile top portions and is used as a waxing and buffing apparatus. At the same time with the changing of the positions of the valve elements within the respective valves 201 and 215, FIG. 8 due to the activation of the respective solenoids 203 and 217, pressurized water from pipe 199 is delivered through the valve 201, through the aspirator 205 for creating a low pressure condition such as will withdraw liquid wax, soap or detergent from the reservoir 209 and thereafter delivering a mixture of such wax, soap or detergent and water through the conduit 199 to the respective canisters 193. The air or pneumatic circuit shown in FIG. 7 above described provides a means of aerating the respective canisters 193 for forming a foam of wax and water or detergent or soap and water, for delivery from the respective canisters 193 onto the vehicle. During this operation, neither of the normally closed limit switch operated safety valves 251 and 277 are operative in any manner to effect the above described operation. Furthr with respect to the operation of the hydraulic circuit, the energization of the solenoid 217, FIG. 8 has caused an opening of the diaphragm operated normally closed water valve 211 so that rinse water is delivered to the rinse arch 25.

If while in the polishing mode and with the overhead curtain 142 in its lowermost position, a vehicle approaches which is too high and would normally engage the curtain 142, there is a possibility of physical damage or mangling such as would destroy the curtain or vehicle. In that case, the excessive height of the vehicle is such as to engage the wand of the limit switch 249, which operates the safety valve 251 reversing its valve element. This opens the valve 251 so that pressurized air through conduit 255 passes through the shuttle valves 253 and 259 and conduit 257 delivering an air signal to the pilot 260 of four way valve 261. This would cause an immediate retraction of the curtain 142 to the inoperative mode. The buffing side wheel assemblies 167 actually do not need to be shifted out of the way so that they are not retracted at this stage. There will not be any damage to these wheels, if not retracted. Therefore, all that is required in the functioning of the safety circuit includes either of the valves 251 and 277 operated by limit switches 249, for retracting the curtain 142 to an overhead position.

The safety limit switch control valve 251 has a flow control valve 247 therein which actually acts as a time delay. If a vehicle were to approach, a wand 249 will cause the curtain 142 to immediately retract as the vehicle moves ahead. When the switch or wand comes off, there is a certain time factor involved before the head or rack would actually come down. That gives the vehicle time enough to get out of the way and not do any damage to the friction curtain 142 or to the vehicle.

The safety valve 277 in FIG. 7 includes the limit switch 249 and contact wand such as shown in the left side of FIG. 3. This allows the head, including the friction curtain 142 to be retracted out of the way for as long a period of time for the vehicle to exit and get out of the danger zone and to avoid damaging of the friction curtain or vehicle. Accordingly the two valves 251 and 277 are manually operated by the car.

Each of the hydraulic motors 161 for the connected polishing wheel assemblies 167 has the torque absorbed by the torque bars and torque plate 163. The motor 161 in essence actually floats and has no permanent fixture to the bearing housing itself other than as a journal for the wheel assembly drive shaft 159 driven by the hydraulic motor. The particular motor is manufactured by White Hydraulics of Minneapolis, Minnesota. The bearing housing 153 is designed such that if there is a problem with the bearing or the shaft being bent, it is an easy matter to remove the shaft and the bearing by unbolting the bearings and sliding the whole assembly out of the bearing housing for easy maintenance.

Having described my invention, reference should now be had to the following claims:

I claim:

1. A retractable wax, buff and polish apparatus for a car comprising an upright open framework upon a floor through which a car is adapted to pass;

said framework including a pair of spaced upright side supports at its ends and top cross beams spanning said supports;

upright guide means upon said side supports;

a transverse carriage extending between said side supports at its ends movably mounted upon said guide means for vertical adjustments thereon;

an upright mount plate secured to said carriage intermediate its ends;

a counterweight guidably positioned within one pair of said side supports;

a sprocket chain including spaced idler sprockets journalled upon said framework, said chain at one end secured to said counterweight and at its other end secured to said mount plate;

a pair of laterally spaced horizontal mount arms pivotally mounted intermediate their ends upon said carriage transversely thereof;

a pair of horizontal parallel spaced coplanar curtain racks below said carriage centrally thereof;

support rods on and depending from end portions of said mount arms respectively and pivotally connected to said racks centrally thereof adjacent their opposite ends respectively;

a plurality of elongated parallel spaced flexible fabric panels at their upper ends secured to and depending from said racks;

rotative power means on said mount plate eccentrically connected to one of said mount arms for transversely oscillating said racks relative to said carriage;

said panels defining a segmented curtain adapted on lowering of said carriage for buffing and polishing engagement with the car;

and reciprocal power means upon said framework below said counterweight and connected thereto for selectively raising and lowering said counterweight repsectively for correspondingly lowering and raising said curtain.

2. In the polish apparatus of claim 1, said guide means for including a pair of upright spaced guide rails, the mounting of said carriage including a pair of vertically spaced rollers at each end thereof, each roller having an annular groove retainingly nested between a pair of said guide rails.

3. In the polish apparatus of claim 1, said mount plate being parallel to and spaced above said carriages;

the securing of said mount plate to said carriage including a pair of spaced upright carriage supports secured upon said carriage;

said mount plate being interposed between and at its opposite ends secured to said carriage supports.

4. In the polish apparatus of claim 1, one idler sprocket being mounted upon said top cross beams centrally thereof above said mount plate;

the other idler sprocket being mounted upon said end supports centrally thereof above said counterweight.

5. In the polish apparatus of claim 1, said racks being rectangular, said fabric panels being rectangular;

upper end portions of each panel being removably interconnected individually with said racks, respectively, to facilitate selective replacement thereof.

6. In the polish apparatus of claim 1, said power means on said mount plate including a motor having a drive shaft;

a gear box having an input shaft coupled with said drive shaft and an output shaft mounting and rotating a pitman arm;

and a drive arm at one end eccentrically connected to said pitman arm and at its other end connected to one mount arm.

7. In the polish apparatus of claim 1, said counterweight actuating power means including a hydraulic cylinder and piston rod assembly at one end mounted upon said framework with one end of its piston rod connected to said counterweight;

a pair of liquid reservoirs mounted upon said framework;

a pair of conduits at their one ends connected to the lower ends of said reservoirs, and at their other ends respectively connected to opposite ends of said cylinder assembly;

a source of air under pressure;

and adjustable first valve means connected thereto having a pair of outlet conduits connected to the upper ends of said reservoirs respectively for selectively delivering pressurized oil alternatively to opposite ends of said cylinder assembly for raising and lowering said counterweight.

8. In the polish apparatus of claim 7, said first valve means having a movable valve element normally biased to a first position, one of said conduits pressurizing one reservoir for maintaining said cylinder assembly retracted and the counterweight lowered and the curtain connected thereto elevated;

said first valve means including an air pilot for moving said valve element upon receipt of an air signal to said first position;

said valve element on interruption of said air signal adapted to be biased to a second position for pressurizing the other reservoir, in turn advancing the piston rod of said cylinder assembly elevating said counterweight and lowering said curtain.

9. In the polish apparatus of claim 7, a plurality of canisters mounted upon said side supports, each canister having a plurality of inwardly facing orifices adapted for delivering selectively a foam of detergent or wax for impingement upon the car;

and pneumatic and hydraulic control means for actuating said canisters simultaneously with lowering of said curtain.

10. In the polish apparatus of claim 9, said pneumatic control means including a first circuit having a first conduit connected to a source of pressurized air;

a normally closed second movable valve means connected to said first conduit;

and a second conduit interconnecting said second valve means and each of said foam canisters;

energizing said second valve means delivering pressure air through said second conduit to said canisters.

11. In the polish apparatus of claim 10, said second valve means being normally connected to said first valve means providing an air signal thereto for maintaining said first valve element so positioned for maintaining said counterweight retracted;

said second valve means when energized, cutting off said air pressure signal to said first valve means;

said first valve means being automatically biased to a second position for controlling the elevation of said counterweight and the simultaneous lowering of said curtain.

12. In the polish apparatus of claim 1, a plurality of canisters mounted upon said side supports, each canister having a plurality of inwardly facing orifices adapted for delivering selectively a foam of detergent or wax for impingement upon the car;

and pneumatic and hydraulic control means for actuating said canisters simultaneously with lowering of said curtain.

13. In the polish apparatus of claim 12, said pneumatic control means including a first circuit having a first conduit connected to a source of pressurized air;

a normally closed movable second valve means connected to said first conduit;

and a second conduit interconnecting said second valve means and eachof said foam canisters;

energizing said second valve means delivering pressure air through said second conduit to said canisters.

14. In the polish apparatus of claim 13, said hydraulic control means including a second circuit including a third conduit at one end connected to a source of water under pressure;

a normally closed third valve means interconnecting said third conduit and said canisters;

a supply reservoir holding liquid wax or detergent;

and an aspirator valve means adapted to receive pressurized water from said third valve means when energized, having an inlet connected to said reservoir, and an outlet connected to said canisters for delivering a mixture of wax or detergent and water to said canisters.

15. In the polish apparatus of claim 12, said counterweight actuating means including a cylinder and piston rod assembly at one end mounted upon said framework with one end of its piston rod connected to said counterweight;

a pressure source;

and an adjustable first valve means connected thereto having a pair of conduits connecting opposite ends of said cylinder assembly for raising and lowering said counterweight;

said first valve means having a movable valve element normally biased to a first position, one of said conduits being pressurized for maintaining said cylinder assembly retracted, the counterweight lowered and the curtain connected thereto elevated;

said first valve means including an air pilot for moving said valve element upon receipt of an air signal to said first position;

said valve element on interruption of said air signal adapted to be automatically biased to a second position for pressurizing the other conduit, in turn advancing the piston rod of said cylinder assembly elevating said counterweight and lowering said curtain.

16. In the polish apparatus of claim 12, said pneumatic control means including a first circuit having a first conduit connected to a source of pressurized air;

a normally closed second movable valve means connected to said first conduit;

and a second conduit interconnecting said second valve means and each of said foam canisters;

energizing said second valve means delivering pressure air through said second valve means to said canisters;

and a pneumatic safety circuit including a normally open limit switch controlled seventh valve means in said circuit connected to said source of air pressure and having an outlet connected to said first valve means adapted when closed to provide an air signal thereto directing pressurized air to said cylinder and piston rod assembly for retracting said counterweight and raising said curtain;

and a limit switch connected to said seventh valve means and adapted on engagement by a car to open said seventh valve means for providing said air signal.

17. In the polish apparatus of claim 16, a horizontal locator arm at one end connected to said framework and projecting rearwardly thereof above the path of car travel;

said limit switch being mounted upon said locator arm and including a wand depending therefrom, positioned above a normally sized vehicle;

an oversized vehicle engaging said wand and limit switch controlling said seventh valve means automatically providing said air signal;

said first valve means responding automatically to control lowering of said counterweight and simultaneous raising of said curtain to prevent damage thereto.

18. In the polish apparatus of claim 17, said pneumatic safety circuit including a normally open limit switch controlled eighth valve means in said circuit connected to said source of air pressure and having an outlet connected to said first valve means adapted when closed to provide an air signal thereto directing pressurized air to said cylinder and piston rod assembly for retracting said counterweight and raising said curtain;

and a limit switch connected to said eighth valve means and adapted on engagement by a car to open said eighth valve means for providing a second air signal to said first valve means;

said limit switch of said eighth valve means being mounted on said framework and extending downstream thereof and including a wand depending therefrom normally in the path of movement of the car;

engagement of the car with said wand activating the limit switch of said eighth valve means directing said second air signal to said first valve means and effecting an automatic retraction of said counterweight and elevation of the curtain connected therewith.

19. In the polish apparatus of claim 1, a yieldable counterweight spring stop overlying and normally spaced from said counterweight and depending from the top of one of said pair of side supports for limiting upward movement of said counterweight; and a pair of carriage stops upon said side supports underlying and normally spaced from the ends of said carriage, adapted for limiting downward movement thereof and the curtain connected thereto.

20. In the polish apparatus of claim 1, a pair of opposed horizontal side wheel arms at their one ends pivotally mounted upon said side supports and extending inwardly thereof;

substantially upright bearing housings upon the other ends of each arm;

a hydraulic motor mounted upon each bearing housing and including a depending drive shaft journalled through said bearing housing and depending therefrom;

and a buffing and polishing wheel assembly of fabric material secured to said drive shaft for rotation upon a substantially vertical axis, and adapted to operatively engage leading trailing portions of the car respectively as it moves through said framework.

21. In the polish apparatus of claim 20, a horizontal shock absorber parallel to each side wheel arm, at one end pivotally mounted upon said side supports and including a yieldable and retractable shaft normally spring biased outwardly of said shock absorber and at its outer end pivotally connected to said side wheel arm normally biasing said arm and its polishing wheel assembly into engagement with the car.

22. In the polish apparatus of claim 21, a horizontal air cylinder assembly spaced from and parallel to said shock absorber at one end pivotally connected to said one side support, and including a retractable piston rod at its outer end pivotally connected to said side wheel arm;

said air cylinders, when activated, adapted to retract said side wheel arms and buffer wheel assemblies toward said side supports respectively.

23. In the polish apparatus of claim 22, a pneumatic circuit including a source of pressurized air and a fourth conduit connected to said air cylinder assemblies;

and a normally open solenoid controlled fourth valve assembly interposed in said fourth conduit whereby said air cylinder assemblies are adapted to retract said buffing wheel assemblies;

and an electronic means to actuate said fourth valve assembly to cut off air pressure to said air cylinder assemblies;

said shock absorbers outwardly biasing said buffing wheel assemblies into operative registry with the car.

24. In the polish apparatus of claim 20, a closed hydraulic circuit including a conduit with the pair of hydraulic motors for said side wheel assemblies connected therein series;

an oil reservoir;

a pump having an intake connected into said reservoir and an outlet connected to said conduit;

and a solenoid operated normally closed two way valve connected into said hydraulic circuit;

said conduit outletting into said reservoir;

said motors being actuated simultaneously on opening of said valve.

25. In the polish apparatus of claim 1, an upright inverted U-shaped rinse arch on the floor spaced forwardly of said framework and connected thereto through which a car is adapted to pass;

a water conduit of similar shape mounted upon the interior of said arch having a series of inwardly directed longitudinally spaced orifices;

a water pipe mounted on said framework at one end connected to a source of water under pressure and at its other end connected to said water conduit;

a normally closed pressure responsive fifth valve assembly interposed in said water pipe;

and a normally closed solenoid operated sixth valve assembly connected to a source of pressurized air;

electronic energizing of its solenoid opening said sixth valve assembly pressurizing said fifth valve assembly and opening the flow of pressurized water therethrough to said rinse arch.

26. A retractable wax, buff and polish apparatus for a car comprising an upright framework through which a car is adapted to pass;

upright guide means mounted on said framework at the sides thereof;

a carriage mounted on said framework and movably mounted upon said guide means for vertical adjustments thereon;

a counterweight guidably positioned upon said framework;

connecting means journalled upon said framework, said connecting means at one end secured to said counterweight and at its other end secured to said carriage;

mount arm means mounted upon said carriage transversely thereof;

a horizontal curtain rack below said carriage centrally thereof;

support rod means on and depending from said mount arm means and connected to said rack;

one or more elongated parallel spaced flexible fabric elements depending from said rack;

said elements defining a segmented curtain adapted on lowering of said carriage for buffing and polishing engagement with the car;

and power means upon said framework connected to said connecting means for selectively raising and lowering said counterweight respectively for corresponding lowering and raising said curtain.

* * * * *